May 24, 1927.  
C. S. BUDD  
1,629,653  
GLASS BLOWING MACHINE  
Filed March 26, 1924
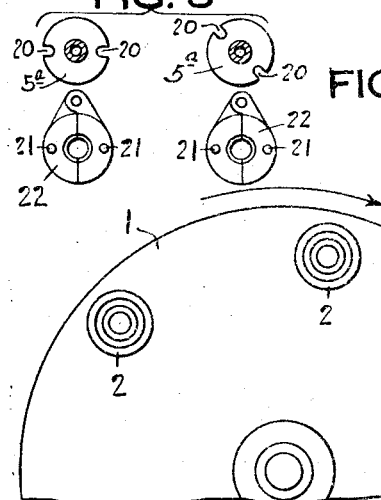
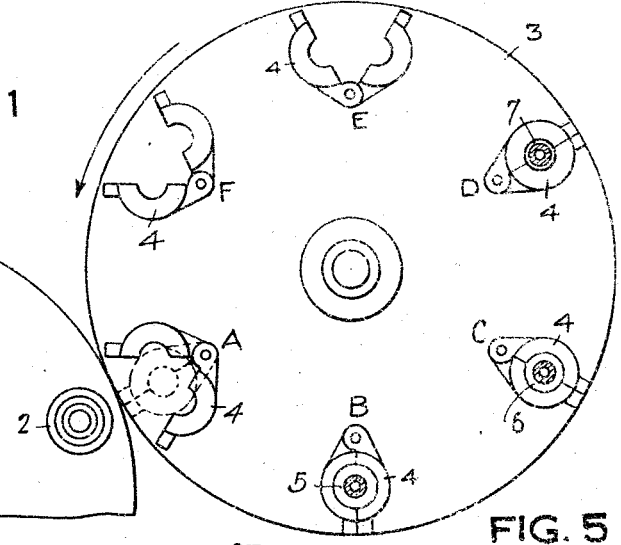
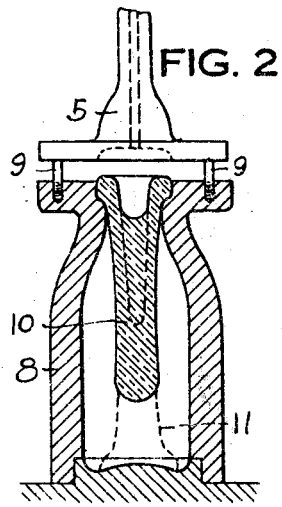
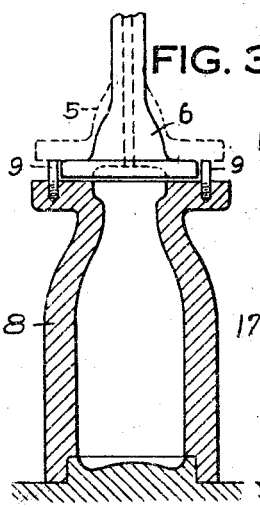
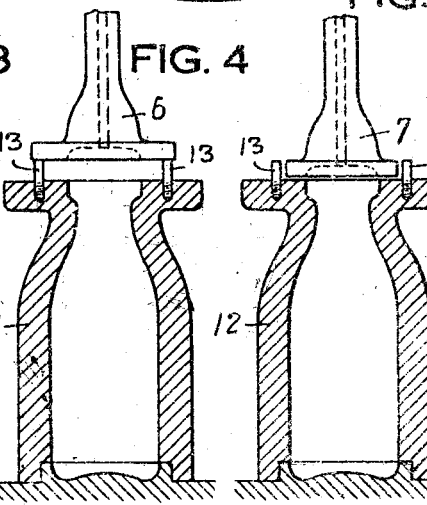
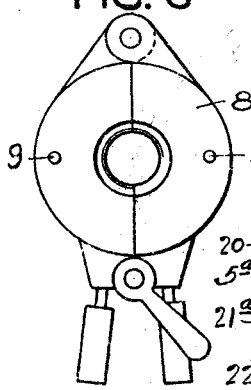
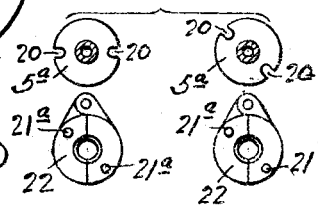
INVENTOR  
Clinton S. Budd,  
By Kay, Totten & Brown,  
Attorneys Patented May 24, 1927.

1,629,653

UNITED STATES PATENT OFFICE.

CLINTON S. BUDD, OF CLARION, PENNSYLVANIA, ASSIGNOR TO HARTFORD-EMPIRE COMPANY, OF HARTFORD, CONNECTICUT, A CORPORATION OF DELAWARE.

GLASS-BLOWING MACHINE.

Application filed March 26, 1924. Serial No. 702,052.

My invention relates to a method and apparatus for blowing glass articles, and particularly to a means and a method whereby articles of different heights may be properly blown from similar blanks and on a single automatic or semi-automatic forming machine. I accomplish this result, in general, by providing the table with molds of a plurality of shapes and causing these molds to co-operate selectively with a plurality of blow-heads in such a manner that air is admitted to certain of the molds only at predetermined blowing stations. The blow-molds having molding cavities of different heights are all supplied with blanks or parisons of the same size and shape, and the blowing of the taller molds is automatically prevented until the blanks in such molds have elongated or "run down" to the proper extent in such blow-molds.

Another object of my invention is to provide a glass-blowing machine with two or more active blow-heads adapted to be employed selectively for blowing the ware at different stations; some or all of the blow-heads being also arranged to operate in succession upon a given blow-mold, so as to assist in holding the glass in close contact with the walls of the mold during the period when the glass is becoming sufficiently rigid to be transferred from the blow-mold to the lehr.

In the manufacture of bottles and other hollow glass articles, it frequently happens that it is desired to make small quantities of ware of substantially the same weight, but of different shapes, and requiring molds of different heights. This is particularly frequent in small factories making soda and soft-drink bottles, which have the same weight but have different shapes and lengths. Since orders of this kind are largely for local customers and are relatively small, the bottle manufacturers try to fill these orders by making a variety of bottles on one blowing machine so as to avoid the expense of equipping an entire machine with each kind of mold that is required. All of the molds on the blowing machine are ordinarily supplied with similar blanks or parisons, and all of the molds are blown at the same blowing station. Therefore the blanks occupy different portions of the internal spaces of the unlike blow-molds when the molds arrive at the blowing station, and this make-shift system always results in faulty distribution of the glass and an unduly large proportion of imperfect ware. My present invention improves this system by taking into account the following considerations:

When a parison of plastic glass is deposited in a blow-mold it begins to lengthen or run down by gravity, and the extent of such lengthening depends upon the period of time between the time when the blank is deposited in the blow mold and the time when the blank is blown out to the shape of the blow-mold. To obtain proper distribution of the glass in the finished article it is desirable that the lower end of the blank be allowed to run down until it touches the bottom of the blow mold or nearly so. In this case the glass tends to expand more evenly in all directions during the blowing operation. If the lower end of the blank is far above the bottom of the blow-mold when the blowing operation begins, the glass tends to blow out to one side or the other of the blow-mold, thus causing uneven distribution and producing finished ware which is usually imperfect and must be discarded.

When molds of different heights are used on the same mold table, and are supplied with blanks of the same length, it is obvious that the blank will run down and touch the bottom of the shortest mold before a similar blank will run down to the bottom of a longer mold.

Automatic blowing machines frequently have six blow-molds on the mold table, and each complete rotation of the table brings each blow-mold to six different positions, of which the first is the transfer position, where the blank is transferred from the blank mold to the blow mold; the second, third or fourth may be the usual blowing position; the fifth position may be the take-out position where the finished ware is removed from the blow-mold, and the sixth position may be an idle position.

This invention aims to cause such a machine to make perfect ware of different heights by preventing the blanks from being blown in the taller blow-molds until the glass has had time to run down and come into or nearly into contact with the bottom of the blow mold. I accomplish this result, in the embodiment of my invention herein shown, by providing the machine with a plurality of blow-heads, all of which are arranged to deliver air to the blow molds at each forward movement of the machine; and by providing means, such as pins or other projections in the tops of the taller blow molds, such projections engaging the under surface of the blow head at the first position and thus preventing the first blow head from blowing air into the mold. For very tall styles of ware I so arrange the pins or projections that they also prevent the second blow-head from operating on the glass, thus giving the blank an interval of two idle positions of the mold table within which the glass may run down in the mold. The second blow head may be made smaller in diameter than the first blow head, so that the second blow-head will pass between the pins or projections in the blow molds when the pins or projections are so arranged that blowing is prevented at the first blowing position and is begun at the second blowing position. Similarly, the third blow-head is made of still smaller diameter than the second blow-head so as to pass between the projections when the projections are so arranged as to prevent blowing at both the first and second blowing positions.

My invention is applicable to various forms of apparatus but for the purpose of illustration, I have shown my invention as employed in connection with a rotary blank-mold table and a rotary blow-mold table, above the latter of which is mounted a plurality of blow-heads past which the molds are moved by the table after having received a blank of molten glass from the blank-molding apparatus. The blow-molds as they move past the blowing stations are engaged by the blow-heads in the usual manner, with the exception that if it is known that the blank in a given mold will not have attained sufficient length when it reaches the first blow-head, for instance, complete operative engagement between the blow-head and the blow-mold is prevented. In some cases, the blowing operation will take place at the second station, and in other cases at the third station, and so on.

In the accompanying drawing, Fig. 1 is a plan view, showing schematically an arrangement wherein my invention may be employed; Fig. 2 is a sectional view showing a blow-mold, after a blank of glass has been deposited therein, and a blow-head held out of operative engagement therewith by means of pins carried by the mold; Fig. 3 is a sectional view showing a blow-head in operative engagement with the blow-mold of Fig. 2; Fig. 4 is a view of a blow-mold having a somewhat taller molding cavity than that of the mold shown in Figs. 2 and 3, and having its pins less remotely spaced than the pins of the mold of Figs. 2 and 3, this figure also showing the blow-head of Fig. 3 held out of operative engagement with the mold; Fig. 5 is a view of the mold of Fig. 4 in operative engagement with a smaller blow-head than that of Fig. 4; Fig. 6 is a plan view of the mold shown in Figs. 2 and 3; Fig. 7 is a partial plan view of the mold of Figs. 4 and 5; and Figs. 8 and 9 are diagrammatic views showing modified arrangements for producing selective blowing according to my invention.

As will appear from Fig. 1, the apparatus comprises a blank-mold table or carrier 1, provided with blank or parison molds 2 which are moved past the station A of a blow-mold table or carrier 3 that is provided with molds 4 which receive the blanks or parisons of glass at the station A, through the instrumentality of transfer mechanism, not shown, which may be of any well known or desired type.

After the blow-molds receive their charges of glass they are moved past the blowing stations, B C and D in the usual manner. At each station, or at one of them, a blow-head is brought into operative engagement with the mold to complete the formation of the article within the mold. At the station E the completed article may be removed from the mold, while at the station F a cooling medium may be supplied to the mold or any other desired operation effected preparatory to the placing of another blank in said mold. The apparatus just referred to need not necessarily be of the automatic type, and may be of any of the usual forms, the principal novel feature of the general construction being the provision of a plurality of simultaneously operating active blow-heads on a single machine.

In Figs. 2 and 3, the blow-head at station B is designated by the numeral 5; in Figs. 3 and 4 the numeral 6 designates the blow-head at station C, while in Fig. 5, the numeral 7 designates the blow-head at station D. It will be observed that the blow-heads 5, 6 and 7 have flanges of different diameters.

Figs. 2 and 3 show a blow-mold 8 which is provided with pins 9 spaced such a distance apart that they hold the blow-head 5 out of operative engagement with the top of the blow-mold, but the blow-head 6, as shown in Fig. 3, will pass between the pins 9 in the manner shown, to expand the blank 10 which, at the station B, had not reached the bottom of the mold 8. The dotted lines 11 of Fig. 2 indicate approximately the position of the lower end of the blank when the station C having the blow-head 6 is reached.

It will be apparent that if the pins 9 were farther apart, the blow-head 5 would have moved down upon the top of the mold at station B and effected a blowing operation. In the shorter molds, wherein the glass blank has reached a point adjacent to the bottom thereof by the time station B is reached, the pins are omitted or are spaced a distance apart to permit the blow-head 5 to pass between them.

In Fig. 4 is shown a mold 12 having pins 13 and having a taller molding cavity than that of the mold 8. The spacing of the pins 13 indicates that a glass blank would not elongate in the mold 12 sufficiently for proper blowing at the station C, but in Fig. 5 such mold is indicated in operative engagement with the blow-head 7 at station D, the blow-head 7 being smaller than the blow-head 6 of the station C.

If a given mold, such as the mold 8 of Figs. 2 and 3, is prevented by its upstanding pins 9 from being blown at the first blowing station and receives its first blow at the second blowing station, it receives a further blow at the third blowing station, since the pins 9 will admit between them the blow-head 7 as well as the larger blow-head 6. A mold which is permitted to engage the first blow-head 5 will of course be blown also at the second and third blowing stations. The use in this manner of two or more active blow-heads on a single blowing machine is advantageous when the machine is making one style of ware as well as when it is making a variety of styles, because, after the first or expanding puff is delivered to each mold, the later puff or puffs prevent the expanded glass from drawing away from the walls of the mold during the time when the surfaces of the glass are becoming chilled enough to support the glass. This same holding effect has been sought heretofore by blowing jets of air into the open top of the blow-mold after the blow-head is removed, but such free jets of air tend to chill the glass too rapidly and too thoroughly, especially when the glass is to be annealed in modern lehrs where the residual heat of the glass is relied upon for annealing. When the glass is introduced into such a lehr, it must have as much residual heat as is consistent with sufficient rigidity to preserve the shape of the glass article. This requirement is well satisfied by my method of applying successive active blow-heads to a given mold, because the later or holding puffs do not sweep a large volume of air through the mold as a free jet would do, but merely increase the pressure within the mold by introducing a relatively small and slowly moving body of air.

Another advantage of this method of holding the glass in contact with the mold is that most of the chilling of the glass takes place on its outer surface which is in contact with the mold, thereby producing a rigid outer shell of sufficient strength to support the article, with less total chilling than is necessary if the glass is chilled substantially on both its inner and the outer surfaces, as in the case when free air jets are employed to hold out the glass in the mold after blowing.

The system, herein described, of preventing the blowing of a hollow article until after the desired interval of "running down" affords a means for controlling and varying the distribution of glass in the finished ware. For example, an article which can be normally blown at the first blowing position, may be given a thicker bottom and a thinner shoulder by delaying the blowing until the mold reaches the second or third blowing position. By utilizing this method of controlling the distribution of the glass, it is possible to employ a given mold with glasses of a variety of compositions, some of which would not be suitable for that particular mold if blown in the normal way.

If desired, means other than the pins herein shown may be employed to prevent blowing at certain stations. Thus some or all of the blow-heads may be provided with projections or other means for preventing blowing engagement between such blow-heads and certain of the molds; or the molds and the blow-heads may be provided with registering projections and depressions for the same purpose, and these may obviously be arranged in a great variety of ways. Also, the projections or other means for producing selective blowing engagement between the blow-heads and the molds may be made adjustable and arranged to be set in operative or inoperative position, as desired.

In some cases it may be desired to blow the ware at the first or second blowing station and to prevent blowing at the subsequent station or stations, as when it is desired to blow an article having a thin bottom. Such a method of operation may be provided by the arrangement shown in Figs. 8 and 9. In Fig. 8 is shown diagrammatically the under surface of a blow-head 5ª similar to the blow head 5 of Fig. 2, having notches 20 formed in opposite sides and so spaced as to admit the pins 21 of a blow-mold 22, when the angular position of the notches 20 is the same as the angular position of the pins 21, as shown at the left of Fig. 8. When, however the blow-head 5ª is turned so as to bring the notches 20 to some other angular position, as shown for example at the right of Fig. 8, the pins 21 will not be received in the notches 20 and blowing will be prevented.

The arrangement of Fig. 8 provides for blowing at the first of the two positions shown and for preventing blowing at the second position. Fig. 9 shows in the same diagrammatic manner an arrangement of similar notches 20 and pins 21ª whereby blowing is prevented at the first position and is permitted in the second position as in the construction shown in Figs. 2 and 5. It will be evident that the notches and pins just described permit any desired selection of the positions at which the blowing is permitted or prevented, such selection being carried out by merely changing the angular relations between the pins and the notches. Also, automatic valve mechanism of various well known types may be employed for preventing flow of air through the blow pipes except when in operative engagement with a mold, or for preventing flow of air through the blow pipes when in engagement with molds in which the glass is not yet ready for blowing. It is not conisdered necessary to illustrate these modified constructions, or the various other modifications which may be made without departing from the spirit and scope of my invention as defined in the accompanying claims.

I claim as my invention:

1. Glass blowing apparatus comprising blowing elements disposed at a plurality of blowing stations, a plurality of blow molds, means for moving said molds to said stations in succession, and means for automatically and selectively preventing a blowing operation on certain of said molds at one of said stations.

2. Glass blowing apparatus comprising a mold carrier, molds of different characters carried thereby, blow heads disposed at fixed blowing stations adjacent to said carrier in position to cooperate with molds mounted on said carrier, and means for preventing operative engagement between one of said blow heads and all molds of a designated character.

3. Glass blowing apparatus comprising a mold carrier, molds of different characters carried thereby, a series of blow-heads of progressively varying dimensions disposed at fixed blowing stations adjacent to said carrier in position to co-operate with molds mounted on said carrier, and means for preventing operative engagement between one of said blow-heads and all molds of a designated character, the said means comprising a projection on such blow-molds which prevents the blow-heads in excess of a predetermined dimension from moving into engagement with such molds.

4. Glass blowing apparatus comprising a mold carrier, molds mounted on said carrier, a series of blow-heads of progressively decreasing diameters disposed adjacent to said carrier in position to co-operate with molds mounted on said carrier, and projections extending upwardly from certain of said molds and preventing blow-heads in excess of a predetermined diameter from operative engagement with such molds.

5. Glass blowing apparatus comprising blowing elements disposed at a plurality of blowing stations, a plurality of molds having molding cavities differing in height, means for moving said molds to said stations in succession, and means for selectively preventing molds having cavities of a given height from being blown at one of said stations.

6. Glass blowing apparatus comprising blowing elements disposed at a plurality of blowing stations, a plurality of molds having molding cavities differing in height, means for moving said molds to said stations in succession, and means for selectively preventing molds having cavities of relatively great height from being blow at the first of said stations.

7. Glass blowing apparatus comprising blowing elements disposed at a plurality of blowing stations, a plurality of molds having molding cavities differing in height, means for moving said molds to said stations in succession, and means for preventing molds having cavities of a given height from being blown at one of said stations, the said means consisting of projections on said molds for preventing a blowing operation at said station.

8. Glass blowing apparatus comprising a mold carrier, a series of blow-heads adjacent to the path of movement of said carrier and progressively of decreasing diameter, and a plurality of molds having molding cavities of different heights, each mold of a given height being provided with projections spaced apart a given distance to prevent movement therebetween of a blow-head whose lower end is wider than said distance.

9. Glass blowing apparatus comprising a rotary mold table carrying a series of molds having molding cavities of different heights, a series of three blow-heads adjacent to said mold table and arranged to approach said molds, means carried by certain of said molds for preventing operative engagement of such molds with the first of said blow-heads, while permitting operative engagement of such molds with the second and third blow-heads, and means carried by other of said molds for preventing operative engagement of said last-named molds with the first and second of said blow-heads while permitting operative engagement of said last-named molds with the third blow-head only.

10. Glass blowing apparatus comprising a rotary mold table carrying a series of molds having molding cavities of different heights, a series of three blow-heads adjacent to said mold table and arranged to approach said molds, the ends of said blow-heads being of progressively decreasing diameter, spaced projections carried by certain of said molds and arranged to prevent operative engagement of the first and largest blow-head with such molds, and other projections carried by certain other molds, and more closely spaced than said first-named projections to prevent operative engagement of said last-named molds with either the first or the second blow-head.

11. The method which consists in supplying blanks of plastic glass to molds having molding cavities of various heights, moving said molds successively to a plurality of blowing stations, and initially blowing the glass in the shorter mold cavities at a station in advance of the station at which the glass is blown in the taller mold cavities.

In testimony whereof I, the said CLINTON S. BUDD, have hereunto set my hand.

CLINTON S. BUDD.